United States Patent [19]

Tronville

[11] 4,432,564
[45] Feb. 21, 1984

[54] REAR SUSPENSION ASSEMBLY FOR MOTOR VEHICLES

[75] Inventor: Pier G. Tronville, Moncalieri, Italy

[73] Assignee: Fiat Auto S.p.A., Turin, Italy

[21] Appl. No.: 337,203

[22] Filed: Jan. 5, 1982

[30] Foreign Application Priority Data

Jul. 22, 1980 [IT] Italy .................. 68167 A/80
Jul. 21, 1981 [FR] France ................ 8114143

[51] Int. Cl.³ ............................................. B60G 19/00
[52] U.S. Cl. ..................................... 280/689; 267/57; 280/721
[58] Field of Search ............... 280/689, 700, 721, 722; 267/57

[56] References Cited

U.S. PATENT DOCUMENTS 2,480,934  9/1949  Julien .................. 280/721
3,386,752  6/1968  Freers .................. 280/721
3,589,700  6/1971  Ruet ................... 267/57
4,094,532  6/1978  Johnson ............... 267/57
4,232,881 11/1980  Kölbel ................. 280/721

FOREIGN PATENT DOCUMENTS 2127146  2/1972  Fed. Rep. of Germany ...... 280/721

Primary Examiner—Bruce H. Stoner, Jr.
Assistant Examiner—John A. Carroll
Attorney, Agent, or Firm—Sughrue, Mion, Zinn, Macpeak, and Seas

[57] ABSTRACT

In a rear axle for motor vehicles, which includes a torsionally-yielding cross member fixed at its ends to two trailing arms carrying the wheel spindles, the cross member has a channel section with a base wall which is disposed upwardly, and two downwardly-inclined end portions. To the ends of the cross member are fixed two tile-shaped reinforcing members which, together with the inclined end portions of the base wall of the cross member, form two box structures defining two bracket-shaped connecting parts in which the two trailing arms are engaged and welded. The tile-shaped reinforcing members are provided with supports for a pair of helical suspension springs of the axle.

5 Claims, 6 Drawing Figures

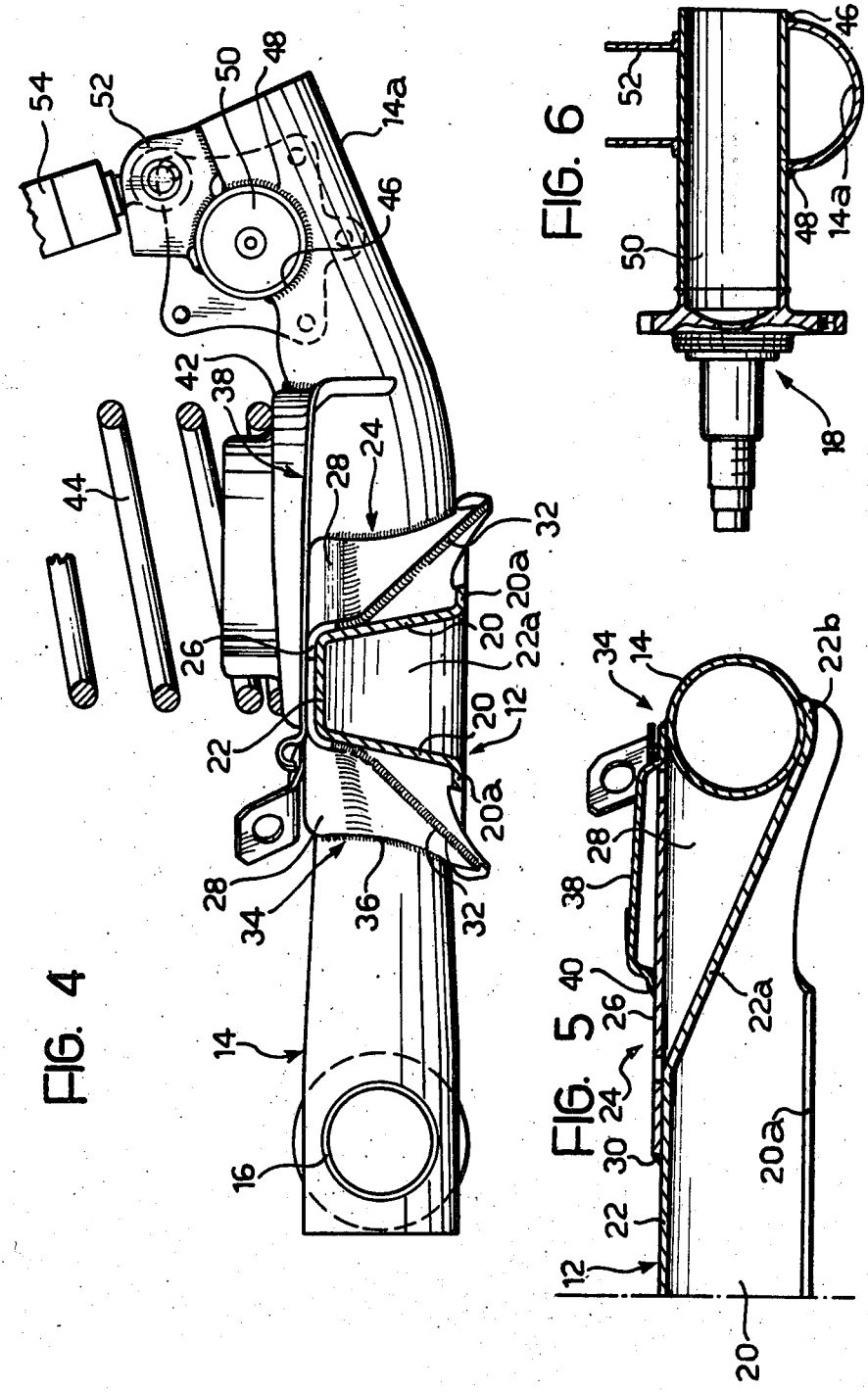

REAR SUSPENSION ASSEMBLY FOR MOTOR VEHICLES

The present invention relates to rear suspension assemblies for motor vehicles, of the type including a pair of trailing arms with high flexural and torsional strength, each of which carries a respective transverse support for a wheel at its rear end, and a flexurally rigid but torsionally yielding cross member which is rigidly connected at opposite ends to the two trailing arms.

Suspension assemblies of this type, which have the advantage of a particularly light and relatively simple construction, are described and illustrated, for example, in German Patent Application Nos. 24 25 740; 24 30 048; 25 57 230, and 27 35 939.

With these suspension assemblies, there is generally a problem in connecting the cross member to the two trailing arms, which should preferably be achieved without making holes which could dangerously weaken the structure. On the other hand, this connection must be able to be effected rapidly, simply and economically, and must clearly be such as to ensure the necessary strength and fatigue resistance of the assembly.

In the known solutions mentioned previously, attempts were made to solve this problem by using angular or diagonal strengthening plates in the zone of connection of the cross member to the two trailing arms.

This type of solution has been found to be unsatisfactory, particularly because of the difficulty in positioning the various components of the axle with the necessary precision during assembly.

A further disadvantage linked to the known solutions mentioned above lies in the disposition of the suspension members of the assembly, that is, the springs and shock absorbers. In order to avoid an increase in stress in the zone of connection of the cross member to the two trailing arms, these suspension members are usually disposed coaxially in the zone of connection of the wheel supports to the two trailing arms so that, when the assembly is installed in a motor vehicle, they necessarily extend within the spaces provided in the vehicle body for the rear wheels. Since the suspension springs normally have considerable diameters and are therefore relatively bulky, this reduces the space available for the trunk of the vehicle.

The object of the present invention is to avoid these disadvantages, and to provide a rear suspension assembly for a motor vehicle of the type defined at the beginning, in which the connections between the cross member and the two trailing arms may be achieved more conveniently and easily and, at the same time, with sufficient strength to enable them to carry the assembly suspension springs, so that these may be disposed in a position which is more favourable with regard to the shape of the trunk of the vehicle to which the suspension assembly is to be fitted.

According to the invention, this object is achieved by virtue of the fact that a motor vehicle rear suspension assembly of the type described at the beginning is characterised in that the cross member has a substantially channel-section with a base wall which is disposed upwardly and has two inclined end portions at opposite ends of the cross member which slope downwardly towards the two trailing arms, and in that two substantially tile-shaped reinforcing members are fixed rigidly to the ends of the cross member, each said member forming, with the corresponding inclined end portion of the base wall of the cross member, a box structure with an outer end which defines a substantially bracket-shaped connecting part in which the respective trailing arm is engaged and fixed by welding, the tile-shaped reinforcing members being provided with supports for a pair of helical suspension springs for the assembly.

The parts for connecting the cross member to the trailing arms are thus particularly strong and hence well able to bear, in use, the increased stress resulting from the loads of the suspension springs. Nonetheless, these connecting parts are relatively light and have the further advantage of considerably simplifying and facilitating the assembly of the suspension assembly.

According to the invention, the two box structures have a shape which, in plan, widens towards the trailing arms, so that each of the two bracket-shaped connecting parts embraces a substantial length of the respective trailing arm.

This characteristic further improves the strength of the suspension assembly, while also minimising the forces to which the cross member is subjected during the more critical operations.

According to another characteristic of the invention, the rear end of each trailing arm is curved slightly upwardly, and has a notch at its upper end in which a pin is engaged and rigidly fixed by welding, the pin projecting transversely outwardly in a cantilevered manner to support the corresponding wheel for rotation.

During assembly of the suspension assembly, this characteristic allows the wheel supports to be positioned exactly in correspondence with the desired values for the camber and convergence of the wheels, without having recourse to further final adjustment operations.

Further characteristics and advantages of the invention will become clear from the detailed description which follows with reference to the appended drawings, provided purely by way of non-limiting example, in which:

FIG. 4 is a section taken along the line IV—IV of FIG. 2;

FIG. 5 is a section taken alone the line V—V of FIG. 2, and

FIG. 6 is a section taken along the line VI—VI of FIG. 2.

Figure 1:
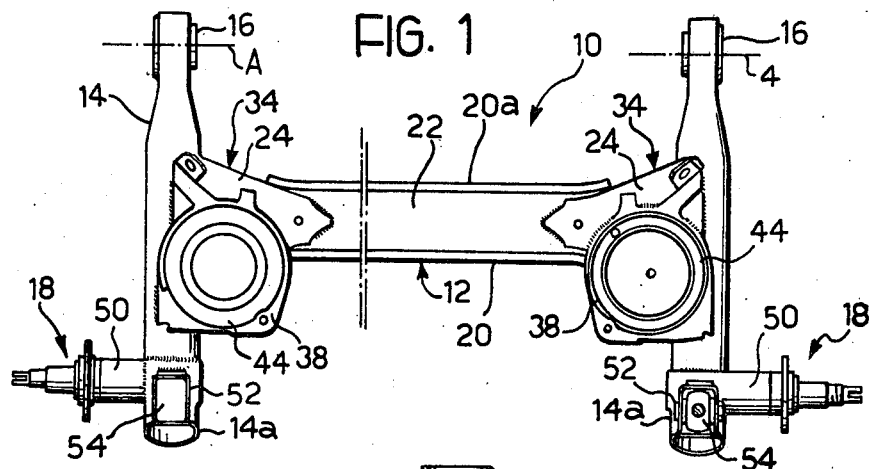
FIG. 1 is a plan view from above of a rear suspension assembly for motor vehicles according to the invention.

Referring initially to FIG. 1, a rear suspension assembly for motor vehicles is generally indicated 10 and includes a cross member 12 and a pair of trailing arms 4 fixed rigidly to the ends of the cross member 12. The two arms 14 are provided at their front ends with bushes 16 for connection to the body of a motor vehicle about a common transverse axis A, and carry at their rear ends two transverse pins or spindles 18 which project outwardly in a cantilevered manner to support the rear wheels of the motor vehicle for rotation.

Figure 3:
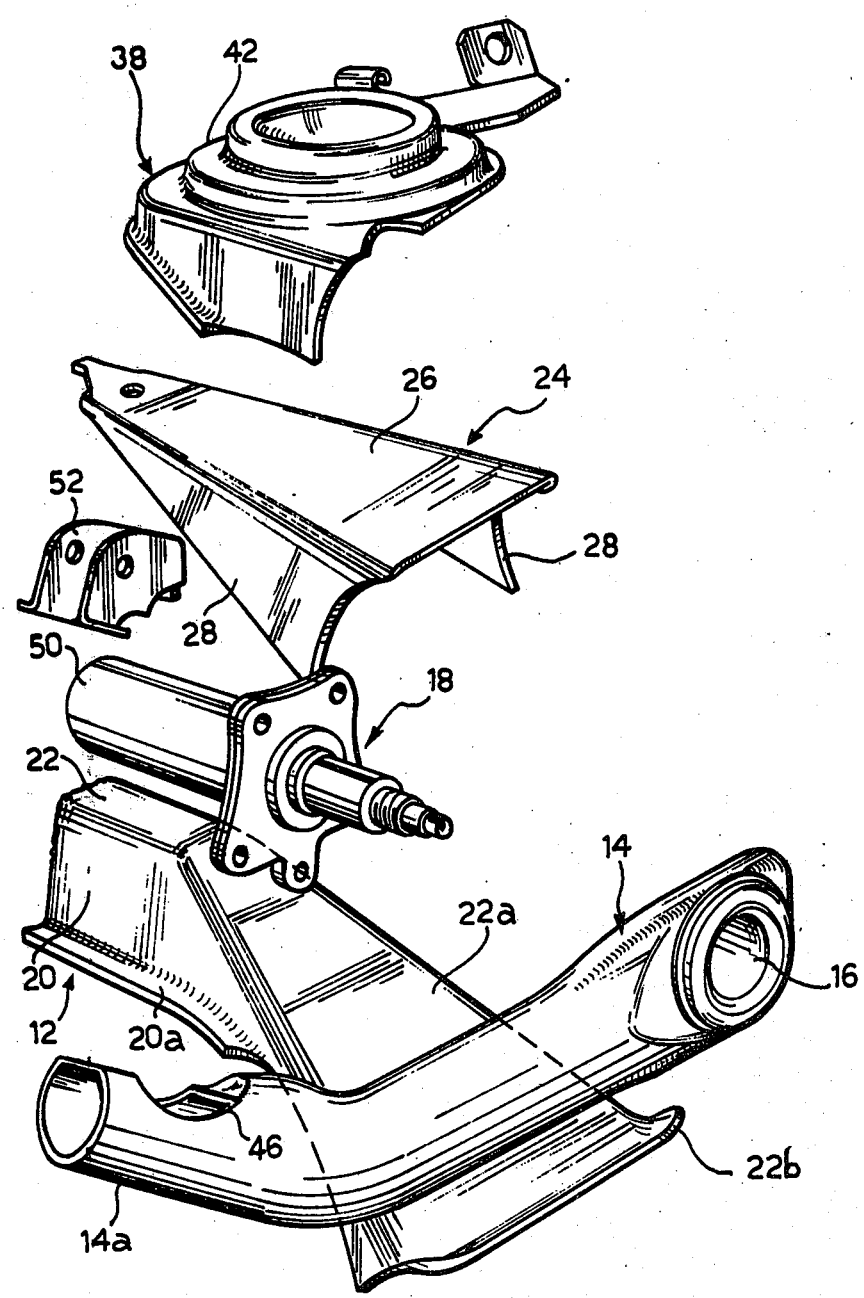
FIG. 3 is an exploded perspective view of FIG. 2.

As shown in detail in FIGS. 3 to 5, the cross member 12 is constituted by a substantially channel-shaped, pressed sheet metal element with its cavity facing downwardly. The side walls 20 of the cross member 12 diverge slightly downwardly and have respective longitudinal edges 20a which are bent outwardly. With this configuration, the cross member 12 has a high flexural strength but is torsionally yielding.

The base wall 22 of the channel-sectioned cross member 12 extends horizontally in the central portion of the cross member, but has inclined end portions 22a which slope downwardly towards the corresponding trailing arms 14. Each end portion 22a has a shape which, in plan, widens towards the arm 14, and has an upwardly curved portion 22b at its outer end edge defining a cradle on which the arm 14 rests.

Figure 2:
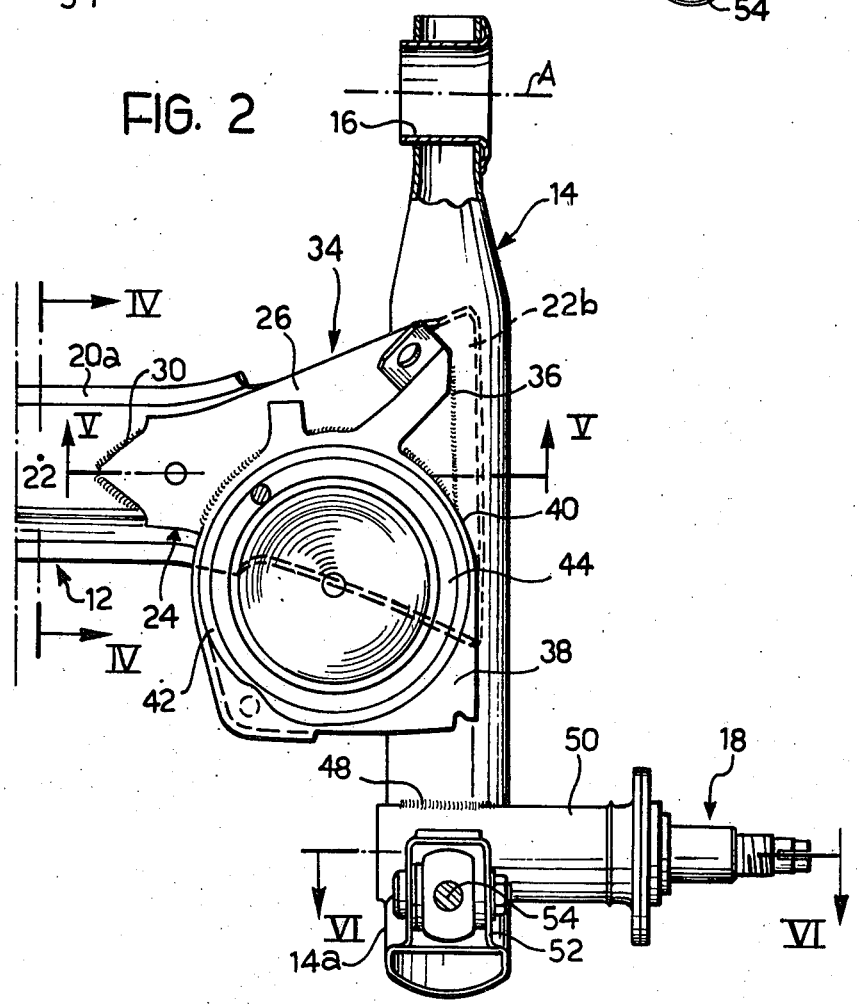
FIG. 2 illustrates a part of FIG. 1 on an enlarged scale.

To each of the two end portions 22a is attached a respective pressed sheet metal reinforcing member 24 which is substantially tile-shaped and has an upper wall 26 and two lateral walls 28. As is clearly seen in FIG. 2, the upper wall 26 is welded at 30 to the base wall 22 of the cross member 12, and extends horizontally above the corresponding inclined portion 22a of this wall 22. The wall 26 has, in fact, a widened shape in plan which is complementary to that of the portion 22, and the walls 28 are bent against the end parts of the walls 20 of the cross member 12, being rigidly connected thereto by welding at 32. In this way, a box structure 34 is defined at each end of the cross member 12, which has an elongated, open outer end defining, as clearly shown in FIG. 5, a connection bracket in which a substantial length of the corresponding trailing arm 14 is inserted. The fixing of the arm 14, which has a tubular structure with high flexural and torsional strength, is effected by a continuous line of welding 36 along the front edge of the walls 26, 28 of the tile 24 and the end edge of the cradle part 22b of the base wall 22 of the cross member 12.

Moreover, the upper part of each of the two box structures 34 is associated with a shaped support 38 of pressed sheet metal, which is fixed by a weld bead 40 partly to the horizontal wall 26 of the tile-shaped member 24 and partly onto the trailing arm 14, and forms in its upper part a flat base 42 on which the lower end of a helical suspension spring 44 bears. The upper end of the suspension spring 44 is intended to bear against an undersurface of a motor vehicle body, when the suspension assembly 10 is in its condition of use.

As clearly shown in FIGS. 3 and 4, the rear end 14a of each arm 14, that is, the end opposite the connection bush 16, is slightly upwardly curved and has a flattened surface at its upper end, in which a notch 46 is formed. A cylindrical pin 50 is engaged and fixed rigidly in this notch by a weld bead, the pin 50 constituting the part for connecting the support 18 for one of the two wheels to the axle 10. By virtue of this configuration the two supports 18 may be positioned easily, during assembly of the axle 10, directly in the exact positions corresponding to the desired values for the camber and convergence of the wheels.

Adjacent the notch 46 of each arm 14 there is also fixed, by means of welding, a stirrup-shaped support member 52 for anchoring the lower end of a conventional shock absorber 54, the upper end of which is intended to be anchored to the wall of the vehicle body defining the space for the corresponding wheel. Since, as stated previously, the suspension springs 44 are located in the zone of connection of the cross member 12 to the arms 14, and therefore in a position forward of the shock absorbers 54, the dimensions of the wheel spaces in the vehicle body may be significantly reduced relative to those necessary in the case of traditional axles in which the suspension springs surround the shock absorbers coaxially. In practice, this allows more useful space to be provided for the rear trunk of the vehicle.

Naturally, while the principle of the invention remains the same, the details of construction and the forms of embodiments may be varied widely from that described and illustrated, without departing from the scope of the present invention.

What is claimed is:

1. A rear suspension assembly for motor vehicles, of the type comprising a pair of trailing arms with high flexural and torsional strength; a transverse wheel support carried at the rear end of each trailing arm, and a cross member which is flexurally rigid but torsionally yielding and is rigidly connected at its opposite ends to the two trailing arms, the improvement comprising:

said cross member having an inverted U-shaped cross section with an upwardly-disposed base wall having two opposing inclined end portions which slope downwardly towards the trailing arms;

an inverted U-shaped reinforcing member overlying and fixed rigidly to each end of the cross member, each reinforcing member forming a box structure with the corresponding inclined end portion of the cross member, a substantially bracket-shaped connecting part being defined at the outer end of the box structure, in which the respective trailing arm is engaged and fixed by welding, and a support for a helical suspension spring of the assembly being provided on each reinforcing member.

2. An assembly according to claim 1, wherein said box structures have a shape which, in plan, widens towards the trailing arms whereby each bracket-shaped connecting part embraces a substantial length of the respective trailing arm.

3. An assembly according to claim 1, wherein the outer end of each inclined end portion of the base wall of the cross member is curved upwardly, and a cradle-shaped rest for the respective trailing arm is defined by said curved outer end.

4. An assembly according to claim 1, wherein the side walls of the cross member diverge slightly in opposite directions from the base wall and said walls have respective longitudinal edges which are turned outwardly.

5. An assembly according to any one of the preceding claims, wherein the rear end of each trailing arm is curved upwardly; a notch is formed in the upper end of said curved rear end, and a pin is engaged and rigidly fixed in said notch by welding, whereby said pin projects in a cantilevered manner to form said wheel support.

* * * * *